US009951796B2

(12) United States Patent
Baltes et al.

(10) Patent No.: US 9,951,796 B2
(45) Date of Patent: Apr. 24, 2018

(54) HYDRAULIC ACCUMULATOR

(71) Applicant: HYDAC TECHNOLOGY GMBH, Sulzbach/Saar (DE)

(72) Inventors: Herbert Baltes, Losheim (DE); Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 15/110,964

(22) PCT Filed: Nov. 29, 2014

(86) PCT No.: PCT/EP2014/003197
§ 371 (c)(1),
(2) Date: Jul. 12, 2016

(87) PCT Pub. No.: WO2015/106782
PCT Pub. Date: Jul. 23, 2015

(65) Prior Publication Data
US 2016/0333895 A1 Nov. 17, 2016

(30) Foreign Application Priority Data
Jan. 14, 2014 (DE) .......................... 10 2014 000 378

(51) Int. Cl.
*F16L 55/052* (2006.01)
*F15B 1/10* (2006.01)
*F16L 55/053* (2006.01)

(52) U.S. Cl.
CPC ...... *F15B 1/106* (2013.01); *F15B 2201/4056* (2013.01); *F15B 2201/605* (2013.01); *F16L 55/053* (2013.01)

(58) Field of Classification Search
CPC ............ F16L 55/053; F15B 2201/3151; F15B 2201/3152; F15B 1/165
USPC ...................... 138/26, 30; 220/721
See application file for complete search history.

(56) References Cited

U.S. PATENT DOCUMENTS

| 3,333,600 A | 8/1967 | Mercier | |
|---|---|---|---|
| 3,722,548 A * | 3/1973 | Mercier | B65D 88/62 138/30 |
| 3,920,047 A * | 11/1975 | Mercier | F15B 1/165 138/30 |
| 4,010,773 A * | 3/1977 | Bihlmaier | F15B 1/14 138/30 |

(Continued)

FOREIGN PATENT DOCUMENTS

| DE | 1 525 730 | 1/1970 |
|---|---|---|
| DE | 26 04 959 | 9/1976 |

(Continued)

OTHER PUBLICATIONS

International Search Report (ISR) dated Mar. 9, 2015 in International (PCT) Application No. PCT/EP2014/003197.

*Primary Examiner* — Patrick F Brinson
(74) *Attorney, Agent, or Firm* — Wenderoth, Lind & Ponack, L.L.P.

(57) ABSTRACT

A hydraulic accumulator, in particular a low-pressure accumulator, has an accumulator housing (2) and a separating element, in particular in the form of an accumulator bladder (22) separating two media chambers (3, 5) in the housing (2). The accumulator housing (2) is formed of at least two shells (8, 10) welded together at their opposing end regions (24).

12 Claims, 2 Drawing Sheets

(56) References Cited

U.S. PATENT DOCUMENTS

| | | | | | |
|---|---|---|---|---|---|
| 4,077,100 | A | * | 3/1978 | Zahid | F15B 1/125 |
| | | | | | 138/30 |
| 4,098,297 | A | * | 7/1978 | Zahid | F15B 1/14 |
| | | | | | 138/30 |
| 4,344,458 | A | * | 8/1982 | Zahid | F15B 1/165 |
| | | | | | 138/30 |
| 4,413,652 | A | * | 11/1983 | Allewitz | F15B 1/106 |
| | | | | | 137/517 |
| 4,826,045 | A | * | 5/1989 | Price | B65D 88/62 |
| | | | | | 138/30 |
| 5,062,455 | A | * | 11/1991 | Schurter | F15B 1/125 |
| | | | | | 138/30 |
| 5,176,178 | A | * | 1/1993 | Schurter | F16L 55/053 |
| | | | | | 138/30 |
| 6,619,325 | B2 | * | 9/2003 | Gray, Jr. | B60K 6/12 |
| | | | | | 137/495 |
| 8,360,107 | B2 | * | 1/2013 | Schneider | F24D 3/1008 |
| | | | | | 138/26 |
| 2004/0045615 | A1 | * | 3/2004 | Rupp | F15B 1/106 |
| | | | | | 138/30 |

FOREIGN PATENT DOCUMENTS

| | | |
|---|---|---|
| DE | 27 20 257 | 12/1977 |
| DE | 102 35 080 | 1/2004 |
| EP | 0 790 411 | 8/1997 |
| FR | 2 266 019 | 10/1975 |
| GB | 826571 | 1/1960 |

\* cited by examiner

HYDRAULIC ACCUMULATOR

FIELD OF THE INVENTION

The invention relates to a hydraulic accumulator, in particular a low-pressure accumulator, comprising an accumulator housing and a separating element arranged therein. In particular, the separating element is in the form of an accumulator bladder separating two media chambers from each other.

BACKGROUND OF THE INVENTION

Hydraulic accumulators are frequently used in systems, in which flowable media such as hydraulic oil or other pressure fluids or lubricants and/or fuels are used as operating media. To this end, hydraulic accumulators can be used, for instance, for energy storage purposes, to provide a fluid reserve, the emergency operation of loads, the absorption of pressure shocks and the like. Given the wide range of tasks for which hydraulic accumulators are used, hydraulic accumulators are produced in relatively large quantities. The amount of production costs and the resulting costs to the user of the hydraulic accumulator therefore are of great economic importance.

SUMMARY OF THE INVENTION

With regard to this problem, the invention addresses the problem of providing an improved hydraulic accumulator, especially in the form of a low-pressure accumulator, which can be manufactured at particular low cost.

One essential feature of the invention is that the accumulator housing is in the form of at least two shells, which are welded to one another at their mutually facing end regions.

The formation of the accumulator housing in the form of a closed welded structure, i.e. without a detachable port for opening the housing with associated sealing, allows the accumulator to be manufactured particularly efficiently and inexpensively as a "disposable accumulator". For the embodiment as a non-openable disposable accumulator, in which the accumulator bladder is installed before welding and cannot be replaced in case of damage, there is no requirement for a bore of sufficient size for the assembly or exchange of the bladder in the accumulator housing. High structural strength of the container can be achieved with particularly little effort.

In particularly advantageous exemplary embodiments, the accumulator housing has two half-shells, each having a circular cylindrical sidewall and a spherical bottom. Particularly advantageously, the half-shells can be provided in the form of identical parts.

The production is particularly efficient and cost saving if deep-drawn shells of a metallic material are provided for the accumulator housing.

In particularly advantageous exemplary embodiments, a central bore is formed in the bottom of a first half-shell. An accumulator bladder at its opening is inserted in and held in tight contact to the edge of the central bore. Through the central bore, the accumulator gas chamber can be filled with working gas.

Particularly advantageously, a fluid port can be provided in the center of the bottom of a second half-shell. This fluid port can be designed such that strainer holes are formed in the bottom of the half-shell. In particular for relatively low pilot pressures, a protective strainer can be formed at the fluid port in a particularly cost-saving manner. In addition, a shut-off valve can be arranged at the fluid port.

The invention also provides a method for manufacturing a hydraulic accumulator according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
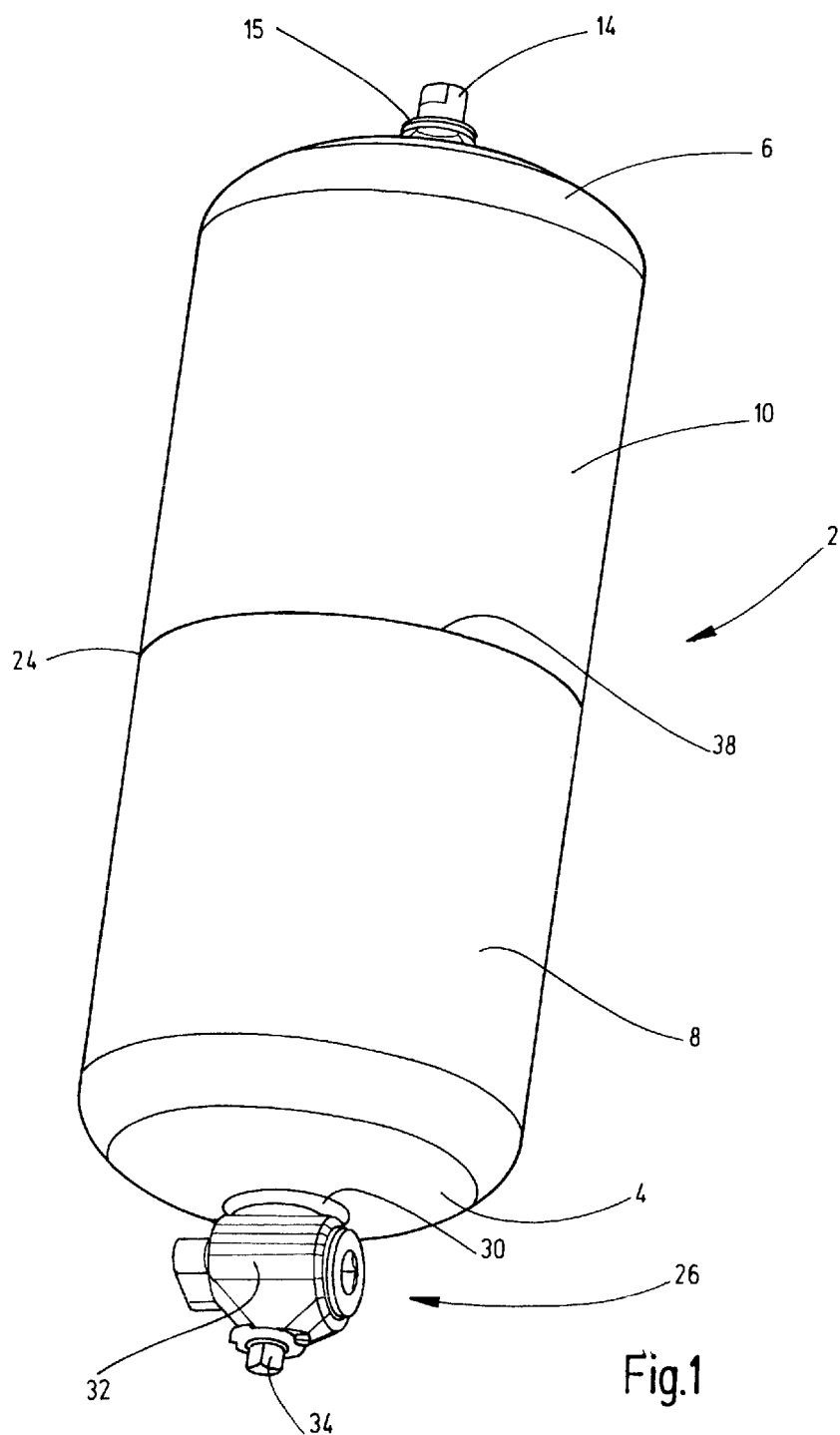
FIG. 1 is a perspective view of a hydraulic accumulator according to an exemplary embodiment of the invention, reduced in size compared to a practical embodiment roughly by a factor of 3.
Figure 2:
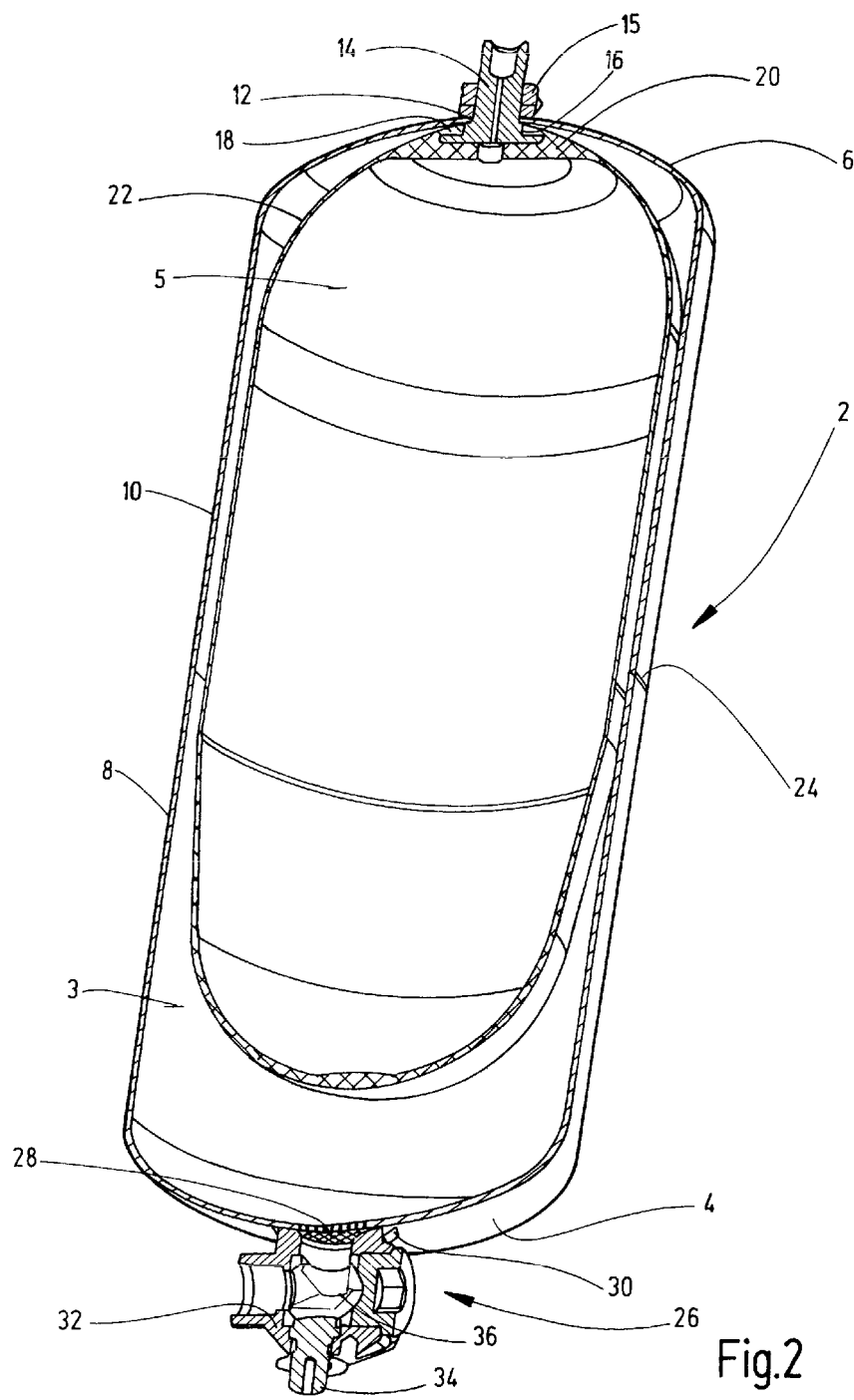
FIG. 2 is a slightly simplified schematic, perspective view in section of the hydraulic accumulator of FIG. 1.

The exemplary embodiment of the hydraulic accumulator according to the invention in the form of a bladder accumulator depicted in the drawings comprise an accumulator housing 2 in the form of a circular cylinder that is closed at both ends by end parts 4 and 6. Each end part 4, 6 is similarly semi-spherically curved. As can be seen most clearly from the sectional view of FIG. 2, the housing 2 has two identical parts designed as half-shells 8 and 10. These half-shells 8, 10 are made of a metallic material by deep-drawing, so that the end parts 4, 6 each form the shell bottom of the respective one-piece half-shell 8 and 10, respectively. In the central area of the bottom of every half-shell 8, 10, i.e. coaxially to the cylinder axis, a media passage is formed. For this purpose, a bore 12 for a connecting part 14 is provided in the upper—in the drawing —end part 6. This bore 12 leads to the gas side 5 of the accumulator, which gas side is formed by the interior of an accumulator bladder 22. Bladder 22 separates the gas side 5 from the surrounding fluid side 3.

In the manner known per se for bladder accumulators, the connecting part 14 passes through the bore 12 in the end part 6 and has a flange 18 at its inner end. This flange 18 is engaged with a rim flange 20 located on the filling opening 16 of the accumulator bladder 22 made of elastomeric material. By a nut 15 on the threaded shank of the connecting part 14, the filling opening 16 of the bladder 22 can be tightly braced against the edge of the bore 12 of the end part 6. As the accumulator housing 2 can no longer be opened at their respective end rims 24 after the half-shells 8, 10 have been welded, the accumulator bladder 22 mounted before welding can be no longer be dismantled after the housing 2 is closed, because the bore 12, which is solely used to form the filling port and is dimensioned correspondingly small, does not permit the installation or removal of the accumulator bladder 22. The design of the housing 2 without a bore of a size sufficient for the installation or removal of the bladder 22 is highly advantageous for the structural strength of the accumulator housing 2.

At the end part 4, which forms the lower—in the drawing—shell bottom, a fluid port 26 is provided as a media passageway. In the hydraulic accumulator according to the invention, which is designed for pilot pressures of the accumulator bladder 22 in the low pressure area, for instance for a rated pressure of 16 bar, the fluid port 26 may have a perforation, which forms a strainer hole 28, in the central part of the end part 4 that is coaxial to the cylinder axis. A connecting element 32 is attached to the end part 4 by a weld 30. In the present exemplary embodiment, the connecting element 32 has a fluid valve in the form of a stopcock 36 actuated by a rotary knob 34.

The weld at the end rims 24 is advantageously configured such that the circumferential weld bead 38 extends on the outside of the housing 2 and the inner wall of the housing remains smooth across the separation line, so that no harmful chafing occurs if the bladder 22 comes in contact with weld head 38. Unlike the exemplary embodiment shown, in which the housing 2 is completely constructed from two half-shells 8, 10, an additional shell part or a plurality of shell parts in the form of pipe sections may be welded between the half-shells 8, 10. Also, in the low-pressure area considered, a plastic material suitable particularly for thermoforming may be provided for the accumulator housing 2.

While one embodiment has been chosen to illustrate the invention, it will be understood by those skilled in the art that various changes and modifications can be made therein without departing from the scope of the invention as defined in the claims.

The invention claimed is:

1. A hydraulic accumulator, comprising:
an accumulator housing formed of first and second shells welded to each other at mutually facing end regions of said shells, said shells being deep drawn and being of metal material capable of being deep drawn, said first shell having a central bore in a spherical end of said first shell, said central bore of said first shell forming a filling port and having dimensions, said second shell having a fluid port in a center of a spherical end of said second shell; and
a separating element arranged in said accumulator housing and separating an interior of said accumulator housing into two media chambers, said separating element being an accumulator bladder and having an opening held in tight contact with an edge of said central bore, said dimensions of said central bore being correspondingly smaller than said accumulator bladder preventing installation and removal of said accumulator bladder through said central bore.

2. A hydraulic accumulator according to claim 1 wherein said first and second shells comprise first and second half-shells, each said half-shell having a circular cylindrical side wall and a semi-spherical end.

3. A hydraulic accumulator according to claim 2 wherein said first and second half-shells are identical.

4. A hydraulic accumulator according to claim 1 wherein said accumulator bladder is fillable with working gas through said central bore.

5. A hydraulic accumulator according to claim 1 wherein strainer holes are formed in said spherical end of said second half-shell at said fluid port.

6. A hydraulic accumulator according to claim 1 wherein a shut-off valve is disposed at said fluid port.

7. A method of manufacturing a hydraulic accumulator, comprising the steps of:
manufacturing first and second shells by deep drawing metallic material;
forming first and second media passages at first and second bottoms of the first and second shells, respectively;
attaching an accumulator bladder at an opening of the first media passage of said first shell; and
manufacturing a closed accumulator housing, after attaching the accumulator bladder to said first media passage of said first shell, by welding first and second rims of the first and second shells together with the accumulator bladder inside the accumulator housing.

8. A method according to claim 7 wherein the first and second shells are identically formed by the deep drawing of the metallic material.

9. A hydraulic accumulator, comprising:
identical first and second half-shells having first and second circular cylindrical side walls, first and second semi-spherical ends, and first and second open ends with first and second rims surrounding said first and second open ends, respectively, said open end of each said half-shell being opposite the respective semi-spherical end;
first and second central passages in said first and second semi-spherical ends, respectively;
an accumulator bladder having an open end directly and tightly contacting an edge of said first central passage; and
a weld directly connecting said first and second rims.

10. A hydraulic accumulator according to claim 9 wherein each of said half-shells are deep drawn metal.

11. A hydraulic accumulator according to claim 9 wherein said second central passage comprises a fluid port with strainer holes in said second semi-spherical end.

12. A hydraulic accumulator according to claim 9 wherein a shut-off valve is disposed at said second central passage.

* * * * *